(12) United States Patent
Miyake (10) Patent No.: US 10,543,719 B2
(45) Date of Patent: Jan. 28, 2020

(54) PNEUMATIC TIRE

(71) Applicant: TOYO TIRE & RUBBER CO., LTD., Osaka-shi, Osaka (JP)

(72) Inventor: Akinori Miyake, Osaka (JP)

(73) Assignee: TOYO TIRE CORPORATION, Itami-shi, Hyogo (JP)

( * ) Notice: Subject to any disclaimer, the term of this patent is extended or adjusted under 35 U.S.C. 154(b) by 161 days.

(21) Appl. No.: 15/222,249

(22) Filed: Jul. 28, 2016

(65) Prior Publication Data

US 2017/0028786 A1 Feb. 2, 2017

(30) Foreign Application Priority Data

Jul. 29, 2015 (JP) .................................. 2015-150103

(51) Int. Cl.
*B60C 9/18* (2006.01)
*B60C 9/22* (2006.01)
*B60C 11/03* (2006.01)
*B60C 11/12* (2006.01)
*B60C 9/20* (2006.01)

(52) U.S. Cl.
CPC ............ *B60C 9/20* (2013.01); *B60C 11/0306* (2013.01); *B60C 2009/2016* (2013.01); *B60C 2009/2061* (2013.01); *B60C 2200/06* (2013.01)

(58) Field of Classification Search
CPC .... B60C 9/18; B60C 9/20; B60C 9/22; B60C 11/03; B60C 11/033; B60C 11/1259; B60C 2011/0339; B60C 2011/0351; B60C 2011/0355; B60C 2011/0362; B60C 2011/0379; B60C 2011/1286
See application file for complete search history.

(56) References Cited

U.S. PATENT DOCUMENTS

2009/0211685 A1   8/2009   Kabe et al.
2014/0326380 A1   11/2014  Kotoku
(Continued)

FOREIGN PATENT DOCUMENTS

CN   103813911 A   5/2014
DE   3643046     *   6/1988
(Continued)

OTHER PUBLICATIONS

Machine translation of DE 3643046, 1988.*
(Continued)

*Primary Examiner* — Justin R Fischer
(74) *Attorney, Agent, or Firm* — Westerman, Hattori, Daniels & Adrian, LLP (57) ABSTRACT

A belt layer of a pneumatic tire includes a first main working belt, a second main working belt arranged at an outer side of the first main working belt in a tire-radial direction, and a reinforcement belt. A cord angle of the second main working belt differs from that of the first main working belt in a direction with respect to a tire-circumferential direction. A cord angle of the reinforcement belt is not smaller than 6 degrees and not larger than 9 degrees. A width of the reinforcement belt is equal to or wider than 50% of a tire-section width and not wider than either narrower one of the first and second main working belts. A width of a shoulder land portion is between 10% and 15% of a tread width which is a distance from a center of the tread portion to one end of the tread portion.

8 Claims, 8 Drawing Sheets

(56) References Cited

U.S. PATENT DOCUMENTS

| | | |
|---|---|---|
| 2015/0165822 A1 | 6/2015 | Koutoku |
| 2015/0314648 A1 | 11/2015 | Sejalon |
| 2016/0006823 A1 | 1/2016 | Strong et al. |
| 2016/0009140 A1 | 1/2016 | Ono |

FOREIGN PATENT DOCUMENTS

| | | | |
|---|---|---|---|
| EP | 1902867 | * | 3/2008 |
| GB | 763816 | * | 12/1956 |
| GB | 1346006 A | | 2/1974 |
| JP | 2005-104437 A | | 4/2005 |
| JP | 2007-045334 A | | 2/2007 |
| JP | 5182455 B1 | | 4/2013 |
| JP | 2014-189243 A | | 10/2014 |
| JP | 2014-213649 A | | 11/2014 |
| WO | 2014/095957 A1 | | 6/2014 |

OTHER PUBLICATIONS

Office Action dated Jul. 3, 2017, issued in counterpart Chinese Application No. 201610590817.8, with English Translation. (19 pages).

Office Action dated Feb. 13, 2018, issued in counterpart Chinese Application No. 201610590817.8, with English translation (14 pages).

\* cited by examiner

PNEUMATIC TIRE

CROSS-REFERENCE TO RELATED APPLICATIONS

This application claims priority of Japanese Patent Application No.: 2015-150103 filed on Jul. 29, 2015, the content of which is incorporated herein by reference.

BACKGROUND OF THE INVENTION

Technical Field

The present invention relates to a pneumatic tire.

Related Art

In a pneumatic radial tire for a heavy load used for a vehicle such as a truck or a bus, it has been known that a belt layer arranged between a carcass and a tread portion includes a reinforcement belt with cords having a small inclination angle with respect to the tire-circumferential direction (cord angle) of 0 to 5 degrees (see JP 2007-45334 A, JP 2005-104437 A, JP 2014-189243 A, Japanese Patent No. 5182455, JP 2014-213649 A, for example). The reinforcement belt is intended to suppress a growth of the tire in the radial direction.

SUMMARY

The small cord angle of the reinforcement belt ranging from approximately 0 to 5 degrees increases a force for holding a shape of the tread portion to reduce distortion at an end portion of the belt, and therefore is advantageous in view of belt durability.

However, the small cord angle of the reinforcement belt ranging from approximately 0 to 5 degrees causes an excessively large binding force in a tire-radial direction, thereby promoting an increased tendency in the deformation of a tire in the tire-width direction. The increased deformation in the tire-width direction increases the deformation of the tire at an area ranging from a bead portion to a portion having a largest width in a tire cross section. As a result, distortion in the bead portion is increased, causing lower resistance against a defect such as separation in the bead portion (bead durability).

It is an object of the present invention to provide a pneumatic tire that ensures belt durability and an effect of suppressing a growth of the tire in a radial direction and enhances bead durability and partial wear resistance.

An aspect of the present invention provides a pneumatic tire, comprising a belt layer arranged between a carcass and a tread portion, wherein the belt layer comprises: a first main working belt; a second main working belt arranged at an outer side of the first main working belt in a tire-radial direction; and a reinforcement belt, wherein a cord angle of the second main working belt differs from a cord angle of the first main working belt in a direction with respect to a tire-circumferential direction, wherein a cord angle of the reinforcement belt is not smaller than 6 degrees and not larger than 9 degrees, wherein a width of the reinforcement belt is equal to or wider than 50% of a tire-section width and not wider than either narrower one of the first and second main working belts, and wherein a width of a shoulder land portion located between a shoulder main groove which is located at the most outer side in a width direction of the tread portion and a tread end is between 10% and 15% of a tread width which is a distance from a center of the tread portion to one end of the tread portion.

In this specification, the term "cord angle" is defined an acute angle which a cord of a belt or a ply forms with respect to a tire-circumferential direction. When the cord extends in the tire-circumferential direction, the cord angle is 0 degrees.

The cord angle of the reinforcement belt set to a value not smaller than 6 degrees and not larger than 9 degrees reduces an effect of suppressing a growth of the tire in the tire-radial direction compared to the case where the cord angle is set to a value not smaller than 0 degrees and not larger than 5 degrees. However, the cord angle of the reinforcement belt is allowed to take 9 degrees at maximum, and therefore there is no possibility that a binding force in the tire-radial direction is excessively reduced. Further, the width of the reinforcement belt is equal to or wider than 50% of a tire-section width. That is, the reinforcement belt has a sufficiently wide width instead of the narrow width. Due to the above-mentioned reasons, the tire can ensure a desired effect of suppressing a growth of the tire in the radial direction. Further, the tire can acquire a sufficient force for holding a shape of the tread portion so that distortion at an end portion of the belt can be reduced whereby the tire can ensure required belt durability. The width of the reinforcement belt is not wider than either narrower one of the first and second main working belts. Accordingly, the distortion generated in the reinforcement belt can be reduced.

As described above, according to the pneumatic tire of the present invention, it is possible to ensure an effect of suppressing a growth of the tire in a radial direction and enhance bead durability and belt durability.

Preferably, a width of a shoulder land portion located between a shoulder main groove which is located at the most outer side in a width direction of the tread portion and a tread end is between 10% and 15% of a tread width which is a distance from a center of the tread portion to one end of the tread portion.

The width of the shoulder land portion is between 10% and 15% of the tread width. This configuration cannot make stiffness of the shoulder land portion insufficient, and can prevent a ground contact pressure from being lowered, thereby suppressing occurrence of partial wear. That is, partial wear resistance can be enhanced.

Preferably, a rubber volume of the shoulder land portion located between the shoulder main groove which is located at the most outer side in the width direction of the tread portion and the tread end is between 25% and 35% of a total rubber volume of the tread portion.

The rubber volume of the shoulder land portion is between 25% and 35% of the total rubber volume of the tread portion. This configuration can make a balance of stiffness appropriate between the shoulder land portion and other land portions. Accordingly, partial wear resistance can be enhanced.

Preferably, a linear distance from a groove bottom center of the shoulder main groove to an outer edge of the reinforcement belt is between −0.07 times and 0.11 times of a half-width of the reinforcement belt.

Preferably, the reinforcement belt is arranged between the first main working belt and the second main working belt.

Arranging the reinforcement belt between the first main working belt and the second main working belt can alleviate breakage of the cord in the vicinity of a road contact surface, and therefore cord breakage can be effectively prevented.

The cord angles of the first and second main working belts can be respectively 20±10 degrees. Further, the cord angles of the first and second main working belts can be respectively 17±5 degrees.

The belt layer can further comprise a protection belt arranged at an outer side of the second main working belt in the tire-radial direction.

The belt layer can further comprise a buffer belt arranged at an inner side of the first main working belt in the tire-radial direction.

The pneumatic tire can have an aspect ratio of not larger than 70% and a nominal section width of not smaller than 365.

According to the pneumatic tire of the present invention, bead durability can be enhanced while ensuring the effect of suppressing the growth of the tire in the radial direction and belt durability.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Figure 1:
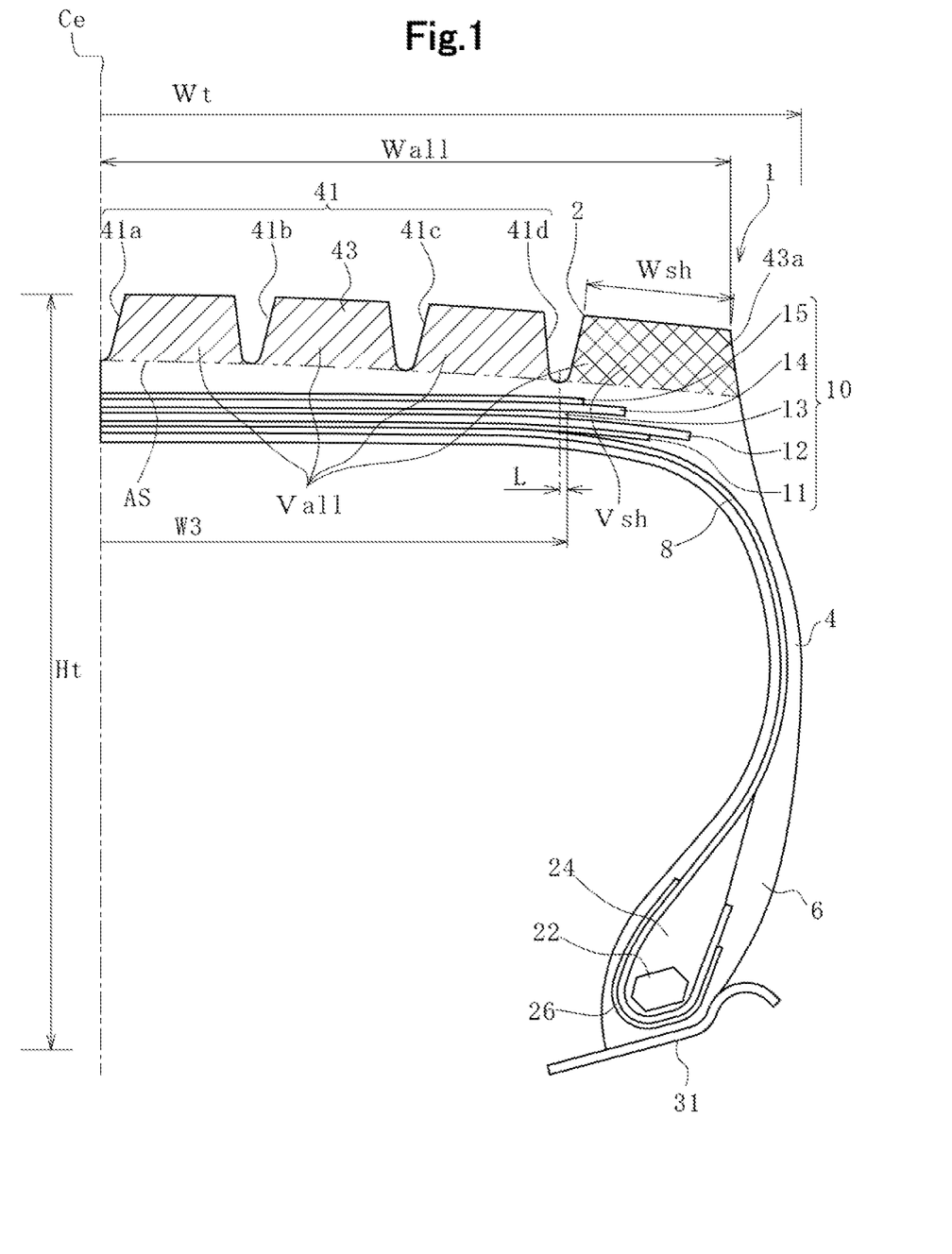
FIG. 1 is a meridian sectional view of a pneumatic tire according to an embodiment of the present invention.

FIG. 1 shows a rubber pneumatic tire (hereinafter referred to as "tire") 1 according to an embodiment of the present invention. The tire 1 is a pneumatic radial tire for a heavy load used for a vehicle such as a truck or a bus. Further, the tire 1 is a low-profile tire having an aspect ratio of not larger than 70%. An aspect ratio is defined as a ratio of a maximum tire-section height Ht to a maximum tire-section width Wt. Specifically, a size of the tire 1 in this embodiment is 445/50R22.5 (expressed in accordance with ISO standard).

The tire 1 includes a tread portion 2, a pair of side portions 4, and a pair of bead portions 6. The bead portions 6 are respectively formed on inner edge portions of the side portions 4 in a tire-radial direction (edge portions of the side portions 4 opposite to the tread portion 2). A carcass 8 is arranged between the pair of bead portions 6. An inner liner (not shown in the drawing) is arranged in an innermost peripheral surface of the tire 1. A belt layer 10 is arranged between the carcass 8 and a tread surface of the tread portion 2. In other words, in the tread portion 2, the belt layer 10 is arranged at an outer side of the carcass 8 in the tire-radial direction. As described later in detail, in this embodiment, the belt layer 10 includes five belts 11 to 15.

The tread portion 2 includes a plurality of main grooves 41 extending zigzag in a tire-circumferential direction. Here, the main grooves 41 include a total of seven main grooves 41 at a center in a tire-width direction (indicated by a center line Ce in the tire-width direction in FIGS. 1 and 2) and at three positions at each side thereof. The main groove located on the center line Ce is a first main groove 41a, the main groove located at each side thereof is a second main groove 41b, the main groove located at each outer side thereof is a third main groove 41c, and the main groove located at each of the most outer sides in the tire-width direction is a shoulder main groove 41d. The main grooves 41a to 41d form a plurality of land portions in the tread portion 2. The tread portion 2 includes a plurality of lateral grooves 42 extending in the tire-width direction. The lateral grooves 42 divide each land portion of the tread portion 2 into a plurality of blocks 43.

Figure 2:
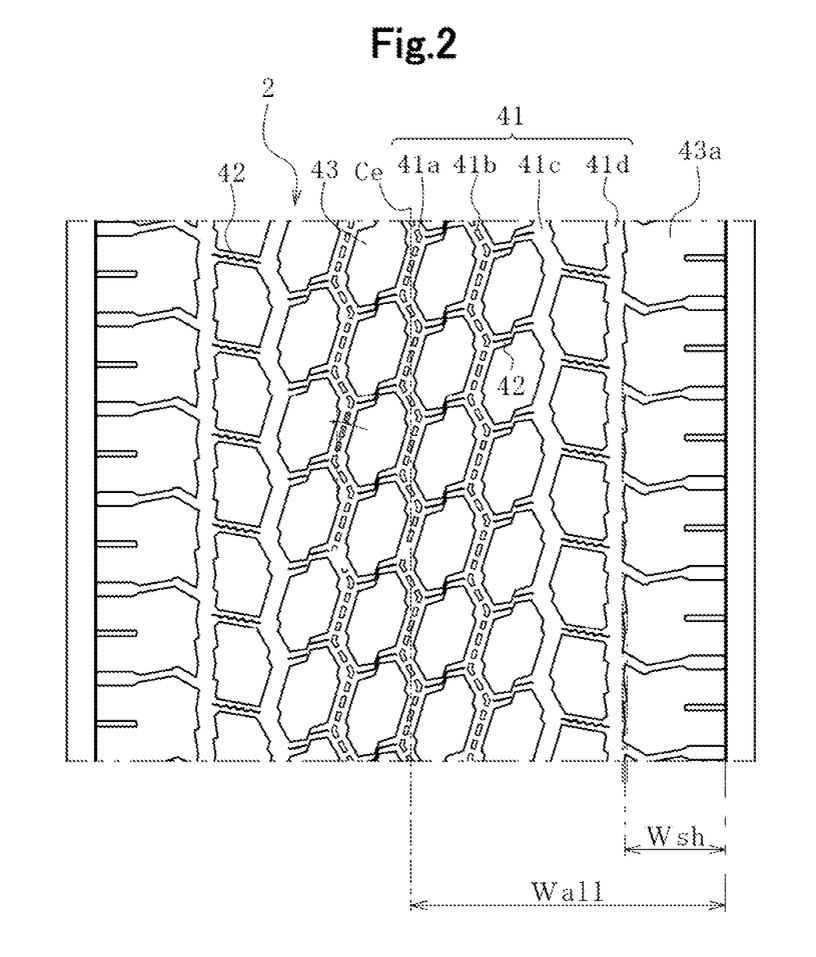
FIG. 2 is a partial development view of a tread portion of the pneumatic tire in FIG. 1.

The block 43 located in the most outer row in the tire-width direction of the tread portion 2 is a shoulder block 43a. A ratio Wsh/Wall of a width of the shoulder block 43a (i.e., a shoulder block width) Wsh to a tread width Wall which is a distance from the center line Ce of the tread portion 2 to an outer edge of the shoulder block 43a is 10%≤Wsh/Wall≤15%. Here, in a state where the tire is assembled to a wheel at an internal pressure determined by the Tire and Rim Association, Inc (TRA), a liner distance from the center line Ce to the outer edge of the shoulder block 43a in a tire meridian section is the tread width Wall. Under the same conditions, a liner distance between both side edges of the shoulder block 43a is the shoulder block width wsh. A position at an inner edge of the shoulder block 43a is displaced in the tire-width direction, so that a position of the shoulder block 43a which passes a center of a maximum value of the shoulder block width Wsh and a minimum value of the shoulder block width Wsh is an imaginary inner edge. A liner distance between the imaginary inner edge and the outer edge of the shoulder block 43a is the shoulder block width Wsh.

Figure 3:
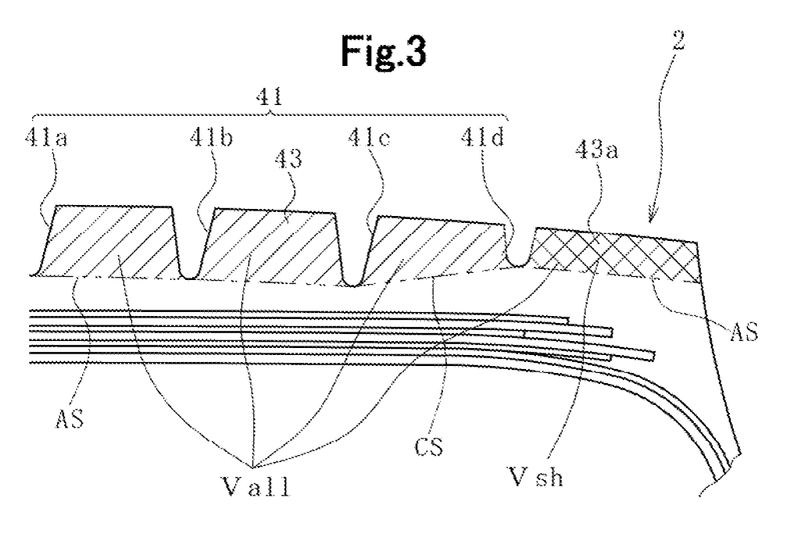
FIG. 3 is a partial meridian sectional view of a pneumatic tire according to another embodiment.

Although FIG. 1 illustrates only half of the meridian section of the tire, a ratio Vsh/Vall of a rubber volume Vsh of the shoulder block 43a to a total rubber volume Vall of the tread portion 2 is 25%≤Vsh/Vall≤35%. Here, under the same conditions as those described above, an identical arc surface which connects main groove bottoms (imaginary arc surface AS) is assumed to compare rubber volumes in regions located at an outer diameter side relative to the imaginary arc surface AS. Between adjacent main grooves having different depths, a region located at an outer diameter side relative to a circumferential surface including a tangent line between arc surfaces forming groove bottoms in the meridian section of the tire is a rubber volume. In an example in FIG. 3, from the first main groove 41a to the third main groove 41c, and from the shoulder main groove 41d to the outside shoulder block 43a, regions located at an outer diameter side relative to the imaginary arc surface which passes the main groove bottoms are rubber volumes. On the other hand, between the third main groove 41c and the shoulder main groove 41d, a region located at an outer diameter side relative to a circumferential surface including a tangent line between arcs forming groove bottoms of the main grooves 41c and 41d in the meridian section of the tire is a rubber volume.

The bead portion 6 includes a bead core 22, a bead filler 24, and a chafer 26. Around the bead core 22, an end portion of the carcass 8 in a tire-width direction is wound up from an inner side to an outer side in a tire-width direction along the bead filler 24. The chafer 26 is arranged around the bead filler 24 so as to be arranged adjacently to an outer side of the end portion of the carcass 8.

Figure 4:
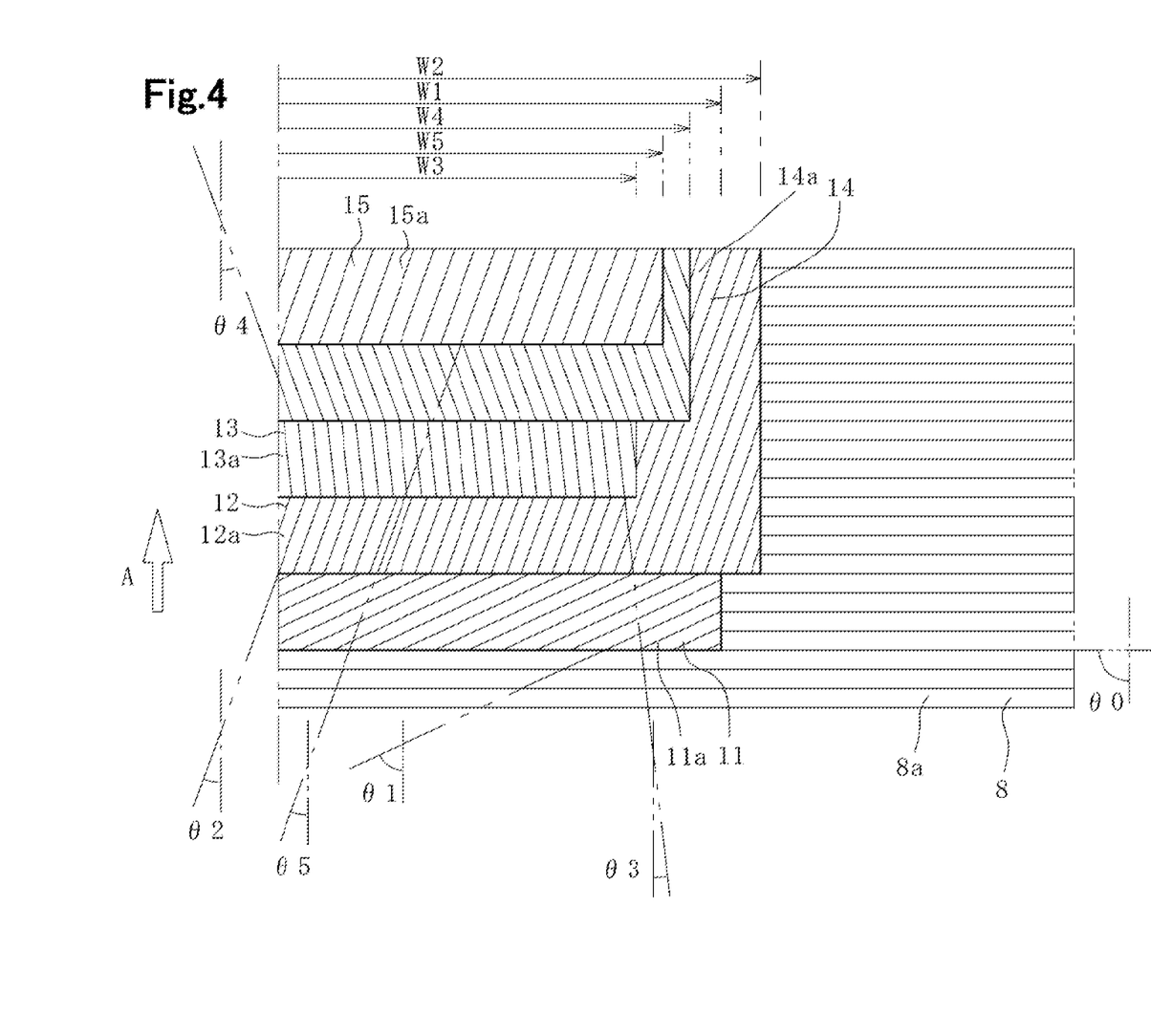
FIG. 4 is a development view of a belt layer.

Referring to FIGS. 1 and 4 the carcass 8 in this embodiment is formed of one carcass ply, and is formed of a plurality of carcass cords 8a arranged parallel to each other and coated by a rubber layer. Each carcass cord 8a is arranged so as to extend in the tire-radial direction, and has an angle θ0 with respect to a tire-circumferential direction (cord angle) set to 90 degrees. In FIGS. 1 and 2, symbol Ce indicates a center line in the tire-width direction. The direction along which the center line Ce extends is a tire-radial direction. While the carcass cord 8a in this embodiment is made of steel, the carcass cord 8a can be made of organic fibers.

Referring to FIGS. 1 and 4 the belt layer 10 in this embodiment includes five belts arranged in an overlapping manner. These belts include a buffer belt 11, a first main working belt 12, a reinforcement belt 13, a second main working belt 14, and a protection belt 15.

The buffer belt 11 is arranged adjacently to an outer side of the carcass 8 in the tire-radial direction. The first main working belt 12 is arranged adjacently to an outer side of the buffer belt 11 in the tire-radial direction. The second main working belt 14 is arranged at an outer side of the first main working belt 12 in the tire-radial direction. The reinforcement belt 13 is arranged between the first main working belt 12 and the second main working belt 14. That is, the reinforcement belt 13 is arranged adjacently to the outer side of the first main working belt 12 in the tire-radial direction, and is also arranged adjacently to an inner side of the second main working belt 14 in the tire-radial direction. The protection belt 15 is arranged adjacently to an outer side of the second main working belt 14 in the tire-radial direction.

Main functions of the first and second main working belts 12 and 14 are to apply a binding force in the tire-radial direction to the carcass 8 (with a cord angle $\theta 0$ being set to 90 degrees). A main function of the reinforcement belt 13 is to compensate for the shortage in a binding force in the tire-radial direction which is applied to the tire 1 by the first and second main working belts 12 and 14. A main function of the protection belt 15 is to enhance external damage resistance of the tire 1 by protecting the first and second main working belts 12 and 14. A main function of the buffer belt 11 is to enhance impact resistance of the tire 1.

Each of these belts 11 to 15 is formed of a plurality belt cords 11a, 12a, 13a, 14a, and 15a arranged parallel to each other and coated by a rubber layer.

Referring FIG. 4 inclination angles (cord angles) $\theta 1$ to $\theta 5$ of the belt cords 11a to 15a of belts 11 to 15 forming the belt layer 10 will be described. In the description hereinafter, regarding the cord angles $\theta 1$ to $\theta 5$, a direction along which the belt cords 11a to 15a extend rightward and away from the center line Ce in the tire-width direction when an arrow A in FIG. 2 is set as a reference direction can be referred to as "right upward direction". Similarly, a direction along which the belt cords 11a to 15a extend leftward and away from the center line Ce in the tire-width direction when the allow A in FIG. 2 is set as the reference direction can be referred to as "left upward direction".

In this embodiment, the cord angle $\theta 2$ of the belt cord 12a of the first main working belt 12 is set to 17 degrees (right upward direction). The cord angle $\theta 2$ can be set to any value which falls within a range of 20±10 degrees, and can preferably be set to a value which falls within a range of 17±5 degrees.

In this embodiment, the cord angle $\theta 4$ of the belt cord 14a of the second main working belt 14 is set to 17 degrees (left upward direction). The cord angle $\theta 4$ can be set to a value which falls within a range of 20±10 degrees, and can preferably be set to a value which falls within a range of 17±5 degrees.

The cord angles $\theta 2$ and $\theta 4$ of the first and second main working belts 12, 14 are set so that the belt cords 12a and 14a extend in different directions with respect to the center line Ce in the tire-width direction. That is, one of the cord angles $\theta 2$ and $\theta 4$ is set so that the belt cords extend in the right upward direction, and the other of them is set so that the belt cords extend in the left upward direction.

The cord angle $\theta 3$ of the belt cord 13a of the reinforcement belt 13 is set to 7 degrees (left upward direction) in this embodiment. The cord angle $\theta 3$ can be set to a value which falls within a range of not smaller than 6 degrees and not larger than 9 degrees.

The cord angle $\theta 1$ of the belt cord 11a of the buffer belt 11 is set to 65 degrees in this embodiment. The cord angle $\theta 1$ can be set to a value which falls within a range of 60±15 degrees.

The cord angle $\theta 5$ of the belt cord 15a of the protection belt 15 is set to 20 degrees in this embodiment. The cord angle $\theta 5$ can be set to a value which falls within a range of 20±10 degrees.

Numerical values (including upper and lower limit values of a numerical value range) of the cord angles $\theta 1$ to $\theta 5$ can include substantially unavoidable errors, and are not necessarily geometrically precise values as long as that functions required for the belts 11 to 15 are satisfied. This is also applied to the cord angle $\theta 0$ of the carcass cords 8a.

The cord angles $\theta 1$ to $\theta 5$ of the belts 11 to 15 can be coordinated as shown in the following Table 1.

TABLE 1

| | Embodiment | Settable range of angle |
|---|---|---|
| Buffer belt | 65 degrees (right upward direction) | 60 ± 15 degrees |
| First main working belt | 17 degrees (right upward direction) | 20 ± 10 degrees (17 ± 5 degrees) |
| Reinforcement belt | 7 degrees (left upward direction) | Not smaller than 6 degrees and not larger than 9 degrees |
| Second main working belt | 17 degrees (left upward direction) | 20 ± 10 degrees (17 ± 5 degrees) |
| Protection belt | 20 degrees (right upward direction) | 20 ± 10 degrees |

Main data except for the cord angles of the belts 11 to 15 in this embodiment are shown in the following Table 2.

TABLE 21

| | Raw material | Diameter of cord (mm) | Thickneas of cord including cover rubber (mm) | Number of ends (EPI) | Width (mm) |
|---|---|---|---|---|---|
| Buffer belt | Steel | 1.1 | 1.7 | 12 | W1 = 345 |
| First main working belt | Steel | 1.4 | 2.6 | 12 | W2 = 370 |
| Reinforcement belt | Steel | 1.1 | 1.7 | 12 | W3 = 290 |
| Second main working belt | Steel | 1.4 | 2.6 | 12 | W4 = 325 |
| Protection belt | Steel | 1.1 | 1.9 | 9 | W5 = 295 |

As shown in Table 2, in this embodiment, a width W4 (325 mm) of the second main working belt 14 which is arranged relatively outer side in the tire-radial direction is set narrower than a width W2 (370 mm) of the first main working belt 12 which is arranged relatively inner side in the tire-radial direction.

A relationship between a width dimension of the reinforcement belt 13 from the center line Ce (i.e., the reinforcement belt width) W3/2 and a liner distance L from a groove bottom center of the shoulder main groove to an outer edge of the reinforcement belt is set to satisfy $-0.07 \leq 2 \times L/W3 \leq 0.11$. The width W3 of the reinforcement belt is a value set under conditions where the tire 1 is mounted on a predetermined rim (a rim 31 is schematically shown in FIG. 1) and is filled with a predetermined internal pressure (830 kPa determined by TRA), with no load applied thereto. The width W3 of the reinforcement belt is set narrower than a width of either narrower one of the first and second main working belts 12 and 14 (W3<W2, W4). In the present embodiment, the width W3 of the reinforcement belt 13 is set to 290 mm. Accordingly, the width W3 of the reinforcement belt 13 is equal to or wider than 50% of a maximum tire-section width Wt (440 mm) under the above-mentioned conditions, and is narrower than the width W4 (325 mm) of the second main working belt 14 having a narrower width.

The cord angle θ3 of the reinforcement belt 13 is set to an angle of not smaller than 6 degrees and not larger than 9 degrees, instead of a small angle of not smaller than 0 degrees to not more than 5 degrees (an angle which can be substantially regarded as 0 degrees or an angle close to 0 degrees). Such configuration can prevent a binding force in a tire-radial direction generated by a reinforcement belt 13 from becoming excessively large, and therefore the excessively large deformation of the tire in the tire-width direction can be suppressed. Since the excessively large deformation of the tire in the tire-width direction can be suppressed, the distortion generated in the bead portion 6 can be suppressed, and therefore bead durability (resistance against the generation of a defect such as separation in the bead portion) can be enhanced.

Figure 5:
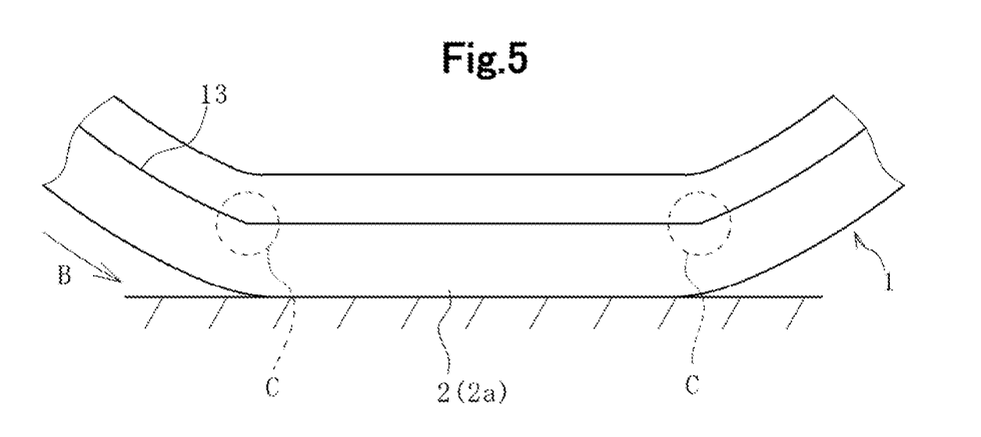
FIG. 5 is a schematic partial sectional view of the pneumatic tire to which a load is applied.

As conceptually shown in FIG. 5 in a loaded state (a state where the tire 1 is mounted on a vehicle), belt cords 13a of the reinforcement belt 13 are bent in regions (symbols C) of a tread surface of the tread portion 2 in front of and behind a road contact surface 2a in the rotational direction of the tire indicated by an arrow B. The smaller cord angle θ3, the more conspicuous the bending of the belt cords 13a becomes. By setting the cord angle θ3 to a value not smaller than 6 degrees and not larger than 9 degrees, compared to a case where the cord angle θ3 is set to a small angle such as an angle not smaller than 0 degrees and not larger than 5 degrees, bending of the belt cord 13a of the reinforcement belt 13 in the vicinity of the road contact surface 2a can be alleviated, and therefore cord breakage can be effectively prevented.

As described above, the width W3 of the reinforcement belt 13 is set narrower than the width W4 of the second main working belt 14 which is narrower one of the first and second main working belts 12, 14. Such configuration can also effectively prevent cord breakage of the belt cord 13a of the reinforcement belt.

As described above, the reinforcement belt 13 is arranged between the first main working belt 12 and the second main working belt 14. With this arrangement, the reinforcement belt 13 is protected by the first and second main working belts 12 and 14, and therefore cord breakage of the belt cord 13a of the reinforcement belt 13, which is caused due to bending of the cord in the vicinity of the ground contact surface 2a (symbols C in FIG. 5), can be effectively prevented.

Due to these reasons, cord breakage of the reinforcement belt 13 can be effectively prevented.

By setting the cord angle θ3 of the reinforcement belt 13 to a value not smaller than 6 degrees and not larger than 9 degrees, an effect of suppressing a growth of the tire 1 in the radial direction is reduced compared to the case where the cord angle θ3 is set to a value not smaller than 0 degrees and not larger than 5 degrees. However, the cord angle θ3 of the reinforcement belt 13 is 9 degrees at maximum, and therefore there is no possibility that a binding force in the tire-radial direction is excessively reduced. Further, as described above, the width W3 of the reinforcement belt 13 is equal to or wider than 50% of a maximum tire-section width Wt. That is, a width of the reinforcement belt 13 is not narrow but is sufficiently wide. Due to these reasons, the tire 1 can ensure a required effect of suppressing a growth of the tire 1 in the radial direction. Further, the tire can acquire a sufficient force for holding a shape of the tread portion 2 so that distortion at the end portion of the belt can be reduced whereby the tire can ensure required belt durability. The width W3 of the reinforcement belt 13 is narrower than a width of the narrower one of the first and second main working belts 12 and 14 (widths W2, W4). Accordingly, the distortion generated in the reinforcement belt 13 can be reduced.

As described above, according to the tire 1 of the present embodiment, bead durability can be enhanced while an effect of suppressing a growth of the tire 1 in the radial direction and belt durability are also ensured.

Figure 6:
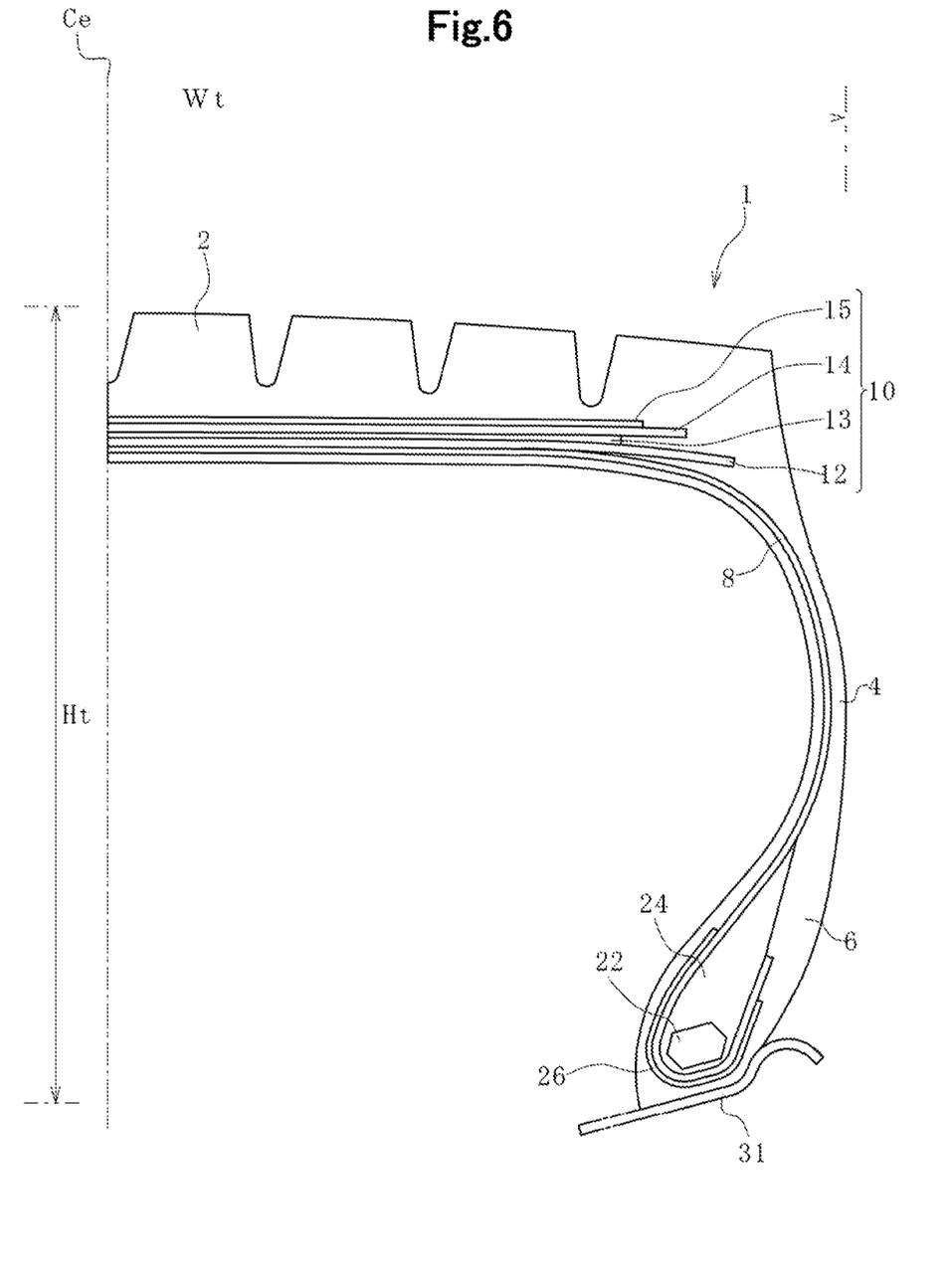
FIG. 6 is a meridian sectional view of a pneumatic tire according to a modification.

FIG. 6 shows a modification of the tire 1 according to the embodiment. In this modification, a belt layer 10 includes four belts, that is, a first main working belt 12, a reinforcement belt 13, a second main working belt 14, and a protection belt 15, but does not include a buffer belt 11. Even in the case where the belt layer 10 does not include the buffer belt 11, bead durability can be enhanced while an effect of suppressing a growth of the tire 1 in the radial direction and belt durability are also ensured.

Examples 1

Tires according to Comparative Examples 1 to 5 and tires according to Examples 1 to 4 shown in the following Table 3 were subjected to an evaluation test performed for evaluating belt durability and bead durability. Assume that data which are not described particularly hereinafter are shared in common by the tires according to Comparative Examples 1 to 5 and the tires according to Examples 1 to 4. Particularly, in all of Comparative Examples 1 to 5 and the tires according to Examples 1 to 4, a tire size is set to 445/50R22.5.

TABLE 3

|  | Comparative Example 1 | Comparative Example 2 | Comparative Example 3 | Comparative Example 4 | Comparative Example 5 |
|---|---|---|---|---|---|
| Note | No reinforcement belt (Fig. 7) | Reinforcement belt extending in circumferential direction | Cord angle θ3 excessively small | Cord angle θ3 excessively large | Width W3 excessively small |
| Cord angle θ3 (degrees) of reinforcement belt | — | 0 | 5 | 10 | 7 |

TABLE 3-continued

|  |  |  |  |  |
|---|---|---|---|---|
| Width W3 of reinforcement belt (mm) | — | 290 | 290 | 290 | 180 |
| W3/Wt * 100 (%) | — | 66 | 66 | 66 | 41 |
| Belt durability | 100 | 130 | 127 | 105 | 90 |
| Bead durability | 100 | 90 | 100 | 120 | 100 |

|  | Example 1 | Example 2 | Example 3 | Example 4 |
|---|---|---|---|---|
| Note | Cord angle θ3 being lower limit value | Cord angle θ3 being a value close to center value | Cord angle θ3 being upper limit value | Width W3 being lower limit value |
| Cord angle θ3 (degrees) of reinforcement belt | 6 | 7 | 9 | 7 |
| Width W3 of reinforceent belt | 290 | 290 | 290 | 220 |
| W3/Wt * 100 (%) | 66 | 66 | 66 | 50 |
| Belt durability | 123 | 120 | 110 | 110 |
| Bead durability | 110 | 115 | 120 | 105 |

Figure 7:
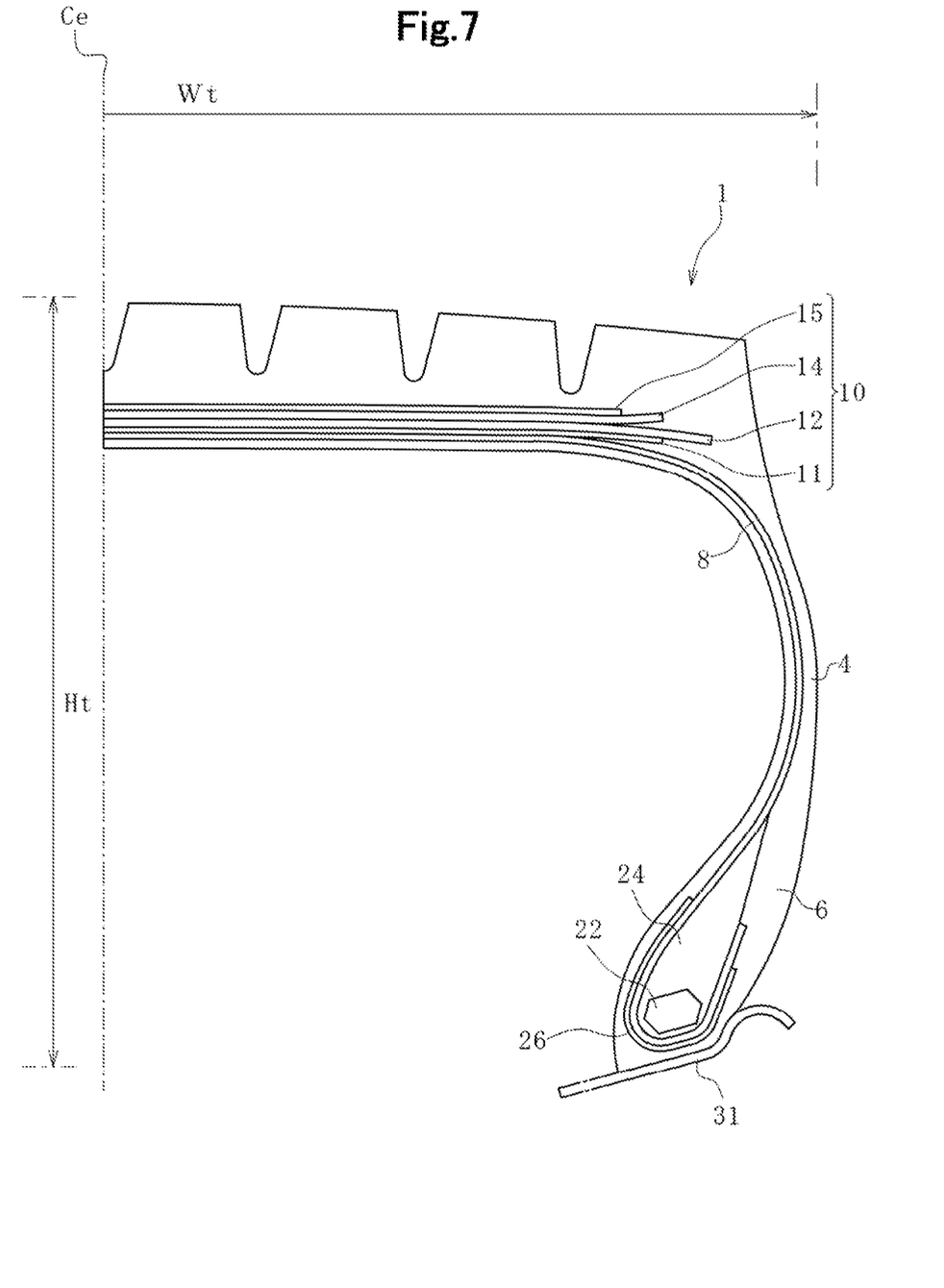
FIG. 7 is a meridian sectional view of a pneumatic tire according to Comparative Example 1.

A belt layer 10 according to Comparative Example 1 shown in FIG. 7 does not include a reinforcement belt 13, but includes a buffer belt 11, a first main working belt 12, a second main working belt 14, and a protection belt 15.

In the tire according to Comparative Example 2, a cord angle θ3 of a reinforcement belt 13 is set to 0 degrees, which is smaller than a lower limit value of a range of a cord angle θ3 (not smaller than 6 degrees and not larger than 9 degrees) in the present invention.

In the tire according to Comparative Example 3, a cord angle θ3 of a reinforcement belt 13 is set to 5 degrees, which is smaller than the lower limit value of the range of the cord angle θ3 (not smaller than 6 degrees and not larger than 9 degrees) in the present invention.

In the tire of Comparative Example 4, a cord angle θ3 according to a reinforcement belt 13 is set to 10 degrees, which is larger than an upper limit value of the range of the cord angle θ3 (not smaller than 6 degrees and not larger than 9 degrees) in the present invention.

In the tire according to Comparative Example 5, a width W3 of a reinforcement belt 13 is set to 180 mm. A tire 1 is mounted on a predetermined rim, the tire is filled with air until a tire internal pressure reaches a predetermined internal pressure, and a maximum tire-section width in an unloaded state is set to 440 mm. Accordingly, in Comparative Example 5, a ratio of the width W3 of the reinforcement belt 13 to a maximum tire section width Wt is 41%. Accordingly, the width W3 of the reinforcement belt 13 according to Comparative Example 5 is narrower than a lower limit value of a width W3 of the reinforcement belt 13 (W3=0.5 Wt) in the present invention.

In the tire of Example 1, a cord angle θ3 of a reinforcement belt 13 is set to 6 degrees, which is the lower limit value of the range of the cord angle θ3 (not smaller than 6 degrees and not larger than 9 degrees) in the present invention.

In the tire according to Example 2, a cord angle θ3 of a reinforcement belt 13 is set to 7 degrees, which is a value close to a center value of the range of the cord angle θ3 (not smaller than 6 degrees and not larger than 9 degrees) in the present invention.

In the tire according to Example 3, a cord angle θ3 of a reinforcement belt 13 is set to 9 degrees, which is the upper limit value of the range of the cord angle θ3 (not smaller than 6 degrees and not larger than 9 degrees) in the present invention.

In the tire according to Example 4, a width W3 of a reinforcement belt 13 is set to 220 mm. As described later, a maximum tire-section width under the conditions of the evaluation test is set to 440 mm. Accordingly, a ratio of the width W3 of the reinforcement belt 13 in Example 4 to the maximum tire-section width Wt is 50%. That is, the width W3 of the reinforcement belt 13 in Example 4 is a lower limit value of the width W3 of the reinforcement belt 13 (W3=0.5 Wt) in the present invention.

In this evaluation test, belt durability and bead durability are evaluated.

In evaluating belt durability, each tire has a tire size of 445/50R22.5, the tire is mounted on a wheel having a rim size of 22.5×14.00 (specified rim), and the tire is filled with air having a pressure of 930 kPa (a value obtained by adding 100 kPa to 830 kPa which is an internal pressure determined by TRA). Each tire mounted on the wheel is mounted on a drum tester, and a traveling test is performed under conditions where a speed is set to 40 km/h and a load is set to 54.4 kN. In such a case, traveling distances of respective tires before the tires are broken are expressed as indexes respectively as shown in Table 3.

In evaluating bead durability, each tire has a tire size of 445/50R22.5, the tire was mounted on a wheel having a rim size of 22.5×14.00 (specified rim), and the tire was filled with air having a pressure of 900 kPa (a value obtained by adding 70 kPa to 830 kPa which is an internal pressure specified by TRA). Each tire mounted on the wheel was mounted on a drum tester, and a traveling test was performed under conditions where a speed is set to 40 km/h and a load is set to 72.5 kN. In such a case, traveling distances of respective tires before the tires were broken are expressed as indexes respectively as shown in Table 3.

An internal pressure of air filled in the tire and a load applied to the tire differ between the evaluation of belt durability and the evaluation of bead durability. The reason is that the condition that distortion is liable to be generated in the belt layer 10 is adopted in the evaluation of belt durability, while the condition that distortion is liable to be generated in the bead portion 6 is adopted in evaluation of bead durability.

In both belt durability and bead durability, assuming the performance of the tire according to Comparative Example 1 as 100, performances of tires according to the remaining Comparative Examples 2 to 5 and Examples 1 to 4 are indexed.

In all Examples 1 to 4, the indexes of belt durability are not smaller than 110, showing that all tires have favorable belt durability. In all Examples 1 to 4, indexes of bead durability are not smaller than 105, showing that the tires can have favorable bead durability.

In the tires according to Comparative Examples 2 and 3 where the cord angles θ3 of the reinforcement belt 13 are lower than a lower limit value of the range of the cord angle θ3 (not smaller than 6 degrees and not larger than 9 degrees) in the present invention, although indexes of belt durability exceed 110, indexes of bead durability are lower than 105. That is, in the case where a cord angle θ3 of a reinforcement belt 13 is set to an angle smaller than a value which falls within the range of the cord angle θ3 according to the present invention, even when a tire has the same belt durability as the tires according to Examples 1 to 4, the tire cannot acquire sufficient bead durability.

In the tire according to Comparative Example 4 where the cord angle θ3 of the reinforcement belt 13 exceeds the upper limit value of the range of the cord angle θ3 (not smaller than 6 degrees and not larger than 9 degrees) of the present invention, although an index of bead durability exceeds 105, an index of belt durability is lower than 110. That is, in the case where the cord angle θ3 of the reinforcement belt 13 is set to an angle larger than a value which falls within the range of the present invention, even when a tire has the same bead durability as the tires of Examples 1 to 4, the tire cannot acquire sufficient belt durability.

In the tire according to Comparative Example 5 where a ratio of a width W3 of the reinforcement belt 13 to a maximum tire-section width Wt is lower than the lower limit value of the range (equal to or wider than 50% of maximum tire-section width) in the present invention, an index of bead durability is lower than 105, and an index of belt durability is lower than 110. That is, when the width W3 of the reinforcement belt 13 is narrower than a value which falls within the range of the present invention, the tire cannot acquire sufficient bead durability and sufficient belt durability.

In the tire according to Comparative Example 4 where the reinforcement belt 13 is arranged at an inner side in the tire-radial direction relative to the first main working belt 12, although an index of bead durability exceeds 105, an index of belt durability is slightly lower than 110. Thus, in view of enhancing belt durability, arranging the reinforcement belt 13 between the first main working belt 12 and the second main working belt 14 is more preferable than arranging the reinforcement belt 13 at the inner side in the tire-radial direction relative to the first main working belt 12.

As described above, it can be understood from a comparison among the tires according to Comparative Examples 1 to 5 and the tires according to Examples 1 to 4 that the pneumatic tire of the present invention ensures belt durability and enhances bead durability.

Example 2

Tires according to Comparative Examples 11 to 18 and tires according to Examples 11 to 17 shown in the following Table 4 are subjected to an evaluation test performed for evaluating partial wear resistance and belt durability of the tread portion 2. Assume that data which are not described particularly hereinafter are shared in common by the tires according to Comparative Examples 11 to 18 and the tires according to Examples 11 to 17. Particularly, in all of the tires according to Comparative Examples 11 to 18 and the tires according to Examples 11 to 17, a tire size is set to 445/50R22.5. In addition, except for Comparative Example 12, a cord angle θ3 of a reinforcement belt 13 is 7 degrees.

TABLE 4

|  | Comparative Example 11 | Comparative Example 12 | Comparative Example 13 | Comparative Example 14 |
|---|---|---|---|---|
|  | No reinforcement belt | Reinforcement belt extending in circumferential direction | Wsh/Wall is excessively low | Wsh/Wall is excessively high |
| Cord angle θ3 (degrees) of reinforcement belt | — | 0 | 7 | 7 |
| Wsh/Wall | 16% | 16% | 9% | 16% |
| vsh/Vall | 39% | 39% | 30% | 30% |
| 2L/W3 | — | 0.02 | 0.02 | 0.02 |
| Partial wear resistance (Sh/Ce) | 100 | 90 | 113 | 111 |
| Belt durability | 100 | 130 | 125 | 125 |

|  | Comparative Example 15 | Comparative Example 16 | Comparative Example 17 | Comparative Example 18 |
|---|---|---|---|---|
|  | Vsh/Vall is excessively low | Vsh/Vall is excessively high | S/Ws is excessively low | S/Ws is excessively high |
| Cord angle θ3 (degrees) of reinforcement belt | 7 | 7 | 7 | 7 |
| Wsh/Wall | 12% | 12% | 12% | 12% |
| Vsh/Vall | 23% | 37% | 30% | 30% |
| 2L/W3 | 0.02 | 0.02 | −0.03 | 0.12 |

TABLE 4-continued

| | | | | |
|---|---|---|---|---|
| Partial wear resistance (Sh/Ce) | 113 | 88 | 104 | 90 |
| Belt durability | 125 | 125 | 98 | 130 |

| | Example 11 | Example 12 | Example 13 | Example 14 |
|---|---|---|---|---|
| | Wsh/Wall, Vsh/Vall, and S/Ws being center value | Wsh/Wall being minimum value | Wsh/Wall being maximum value | Wsh/Wall being mimimum value |
| Cord angle θ3 (degrees) of reinforcement belt | 7 | 7 | 7 | 7 |
| Wsh/Wall | 12% | 10% | 15% | 12% |
| Vsh/Vall | 30% | 30% | 30% | 25% |
| 2L/W3 | 0.02 | 0.02 | 0.02 | 0.02 |
| Partial wear resistance (Sh/Ce) | 100 | 108 | 109 | 108 |
| Belt durability | 125 | 125 | 125 | 125 |

| | Example 15 | Example 16 | Example 17 |
|---|---|---|---|
| | Vsh/Vall being maximum value | S/Ws being minimum vale | S/Ws being maximum value |
| Cord angle θ3 (degrees) of reinforcement belt | 7 | 7 | 7 |
| Wsh/Wall | 12% | 12% | 12% |
| Vsh/Vall | 35% | 30% | 30% |
| 2L/W3 | 0.02 | −0.07 | 0.11 |
| partial wear resistance (Sh/Ce) | 91 | 106 | 93 |
| Belt durability | 125 | 3332 | 125 |

A belt layer according to Comparative Example 11 does not include a reinforcement belt, but includes other four belts (a buffer belt 11, a first main working belt 12, a second main working belt 14, and a protection belt 15).

In the tire according to Comparative Example 12, a cord angle θ3 of a reinforcement belt 13 is set to 0 degrees. A ratio Wsh/Wall of a shoulder block width Wsh to a tread width Wall is 16%, which exceeds a maximum value of the present invention. A ratio Vsh/Vall of a rubber volume Vsh of a shoulder block 43a to a total rubber volume Vall is 39%, which exceeds a maximum value of the present invention. A ratio 2L/W3 of a liner distance L from a groove bottom center of a shoulder main groove 41d to an outer edge of the reinforcement belt to a half-width W3/2 of a width W3 of the reinforcement belt is 0.02, which is a center value of the present invention (hereinafter, the ratio 2L/W3 is 0.02 unless otherwise specified).

In the tire according to Comparative Example 13, a ratio Wsh/Wall of a shoulder block width Wsh to a tread width Wall is 9%, which is less than a minimum value of the present invention. A ratio Vsh/Vall of a rubber volume Vsh of a shoulder block 43a to a total rubber volume Vall is 30%, which is a center value of the present invention.

In the tire according to Comparative Example 14, a ratio Wsh/Wall of a shoulder block width Wsh to a tread width Wall is 16%, which exceeds the maximum value of the present invention. A ratio Vsh/Vall of a rubber volume Vsh of a shoulder block 43a to a total rubber volume Vall is 30%, which is the center value of the present invention.

In the tire according to Comparative Example 15, a ratio Wsh/Wall of a shoulder block width Wsh to a tread width Wall is 12%, which is a center value of the present invention. A ratio Vsh/Vall of a rubber volume Vsh of a shoulder block 43a to a total rubber volume Vall is 23%, which is less than a minimum value of the present invention.

In the tire according to Comparative Example 16, a ratio wsh/Wall of a shoulder block width Wsh to a tread width Wall is 12%, which is the center value of the present invention. A ratio Vsh/Vall of a rubber volume Vsh of a shoulder block 43a to a total rubber volume Vall is 37%, which exceeds the maximum value of the present invention.

In the tire according to Comparative Example 17, a ratio Wsh/Wall of a shoulder block width Wsh to a tread width Wall is 12%, which is the center value of the present invention. A ratio Vsh/Vall of a rubber volume Vsh of a shoulder block 43a to a total rubber volume Vall is 30%, which is the center value of the present invention. A ratio 2L/W3 of a liner distance L from a groove bottom center to an outer edge of a reinforcement belt to a half-width W3/2 of a width W3 of the reinforcement belt is −0.08, which is less than a lower limit value of the present invention.

In the tire according to Comparative Example 18, a ratio Wsh/Wall of a shoulder block width Wsh to a tread width Wall is 12%, which is the center value of the present invention. A ratio Vsh/Vall of a rubber volume Vsh of a shoulder block 43a to a total rubber volume Vail is 30%, which is the center value of the present invention. A ratio 2L/W3 of a liner distance L from a groove bottom center to an outer edge of a reinforcement belt to a half-width W3/2 of a width W3 of the reinforcement belt is 0.12, which exceeds a maximum value of the present invention.

In the tire according to Example 11, a ratio Wsh/Wall of a shoulder block width Wsh to a tread width Wall is 12%, which is the center value of the present invention. A ratio Vsh/Vall of a rubber volume Vsh of a shoulder block 43a to a total rubber volume Vall is 30%, which is the center value of the present invention.

In the tire according to Example 12, a ratio Wsh/Wall of a shoulder block width Wsh to a tread width Wall is 10%, which is a lower limit value of the present invention. A ratio Vsh/Vall of a rubber volume Vsh of a shoulder block 43a to a total rubber volume Vail is 30%, which is the center value of the present invention.

In the tire according to Example 13, a ratio Wsh/Wall of a shoulder block width Wsh to a tread width Wall is 15%, which is an upper limit value of the present invention. A ratio Vsh/Vall of a rubber volume Vsh of a shoulder block 43a to a total rubber volume Vall is 30%, which is the center value of the present invention.

In the tire according to Example 14, a ratio Wsh/Wall of a shoulder block width Wsh to a tread width Wall is 12%, which is the center value of the present invention. A ratio Vsh/Vall of a rubber volume Vsh of a shoulder block 43a to a total rubber volume Vall is 25%, which is a lower limit value of the present invention.

In the tire according to Example 15, a ratio Wsh/Wall of a shoulder block width Wsh to a tread width Wall is 12%, which is the center value of the present invention. A ratio Vsh/Vall of a rubber volume Vsh of a shoulder block 43a to a total rubber volume Vall is 35%, which is an upper limit value of the present invention.

In the tire according to Example 16, a ratio Wsh/Wall of a shoulder block width Wsh to a tread width Wall is 12%, which is the center value of the present invention. A ratio Vsh/Vall of a rubber volume Vsh of a shoulder block 43a to a total rubber volume Vall is 30%, which is the center value of the present invention. A ratio 2L/W3 of a liner distance L from a groove bottom center to an outer edge of a reinforcement belt to a half-width W3/2 of a width W3 of the reinforcement belt is −0.07, which is the lower limit value of the present invention.

In the tire according to Example 17, a ratio Wsh/Wall of a shoulder block width Wsh to a tread width Wall is 12%, which is the center value of the present invention. A ratio Vsh/Vall of a rubber volume Vsh of a shoulder block 43a to a total rubber volume Vall is 30%, which is the center value of the present invention. A ratio 2L/W3 of a liner distance L from a groove bottom center to an outer edge of a reinforcement belt to a half-width W3/2 of a width W3 of the reinforcement belt is 0.11, which is an upper limit value of the present invention.

This evaluation test was performed for evaluating partial wear resistance and belt durability.

In evaluating partial wear resistance, each tire has a tire size of 445/50R22.5, the tire is mounted on a wheel having a rim size of 22.5×14.00 (specified rim), and the tire is filled with air having a pressure of 830 kPa (an internal pressure determined by TRA). A traveling test is performed under conditions where a speed is set to 80 km/h and a load is set to 4625 kg (a 100% load determined by TRA), and a wear energy ratio which acts on the block 43 on the center line Ce and the shoulder block 43a is indexed. Belt durability is evaluated as described above.

In both the partial wear resistance and the belt durability of the tread portion 2, assuming the performance of the tire according to Comparative Example 11 as 100, performances of the tires according to the remaining Comparative Examples 12 to 18 and Examples 11 to 17 are indexed. When an index of partial wear resistance is in a range of 90 to 110, partial wear is less and partial wear resistance is excellent. When an index of partial wear resistance is less than 100, the amount of wear is larger on the block at the center line Ce side than on the shoulder block 43a. When an index of partial wear resistance exceeds 100, the amount of wear is larger on the shoulder block 43a than on the block at the center line Ce side. When an index of partial wear resistance is not larger than 90 and not smaller than 110, partial wear is excessive, and therefore it can be judged that tire performance is inappropriate. When an index of belt durability is less than 100, tire performance is inappropriate, showing that as the index of belt durability is increased, belt durability becomes more excellent.

All of the tires according to Comparative Examples 11 to 18 had tire performance problems. All of the tires according to Comparative Examples 11 to 18, except for the tire according to Comparative Example 17, were inappropriate in partial wear resistance. In the tire according to Comparative Example 17, desired belt durability could not be obtained.

When a ratio Wsh/Wall of a width Wsh of a shoulder block 43a to a tread width Wall is less than 10%, stiffness of the tread portion 2 in the tire-width direction becomes insufficient, and therefore the shoulder block has a larger amount of deformation and is likely to be worn. On the contrary, when the ratio Wsh/Wall exceeds 15%, a ground contact pressure at the shoulder block 43a is lowered, so that the shoulder block 43a is easily slid on a ground contact surface and is likely to be worn.

When a ratio Vsh/Vall of a rubber volume Vsh of the shoulder block 43a to a total rubber volume Vall of the tread portion 2 is less than 25%, the shoulder block 43a has insufficient stiffness compared to the block 43 at the center side, and therefore is likely to be worn. On the contrary, when the ratio Vsh/Vall exceeds 35%, the block 43 at the center side and the shoulder block 43a are reversed in stiffness, so that the block 43 at the center side is likely to be worn.

When the cord angle θ3 of the reinforcement belt 13 is set to between 6 degrees and 9 degrees, bead durability can be enhanced, but suppression of the reinforcement belt 13 in the tire-radial direction is reduced compared to the belt extending in the circumferential direction (θ3=0), stiffness is likely to be ununiform in the tire-width direction. However, when a ratio Wsh/Wall of a width Wsh of the shoulder block 43a to a tread width Wall, a ratio Vsh/Vall of a rubber volume Vsh of the shoulder block 43a to a total rubber volume Vall of the tread portion 2, or a ratio 2L/W3 of a width dimension (a width of the reinforcement belt) W3/2 from the center line Ce of the reinforcement belt 13 to a liner distance L from the groove bottom center of the shoulder main groove to the outer edge of the reinforcement belt is set as described above, all the tires according to Examples 11 to 17 could obtain good values of partial wear resistance and belt durability.

The present invention is not limited to the configurations described in the above embodiments, and various modifications can be made.

Figure 8:
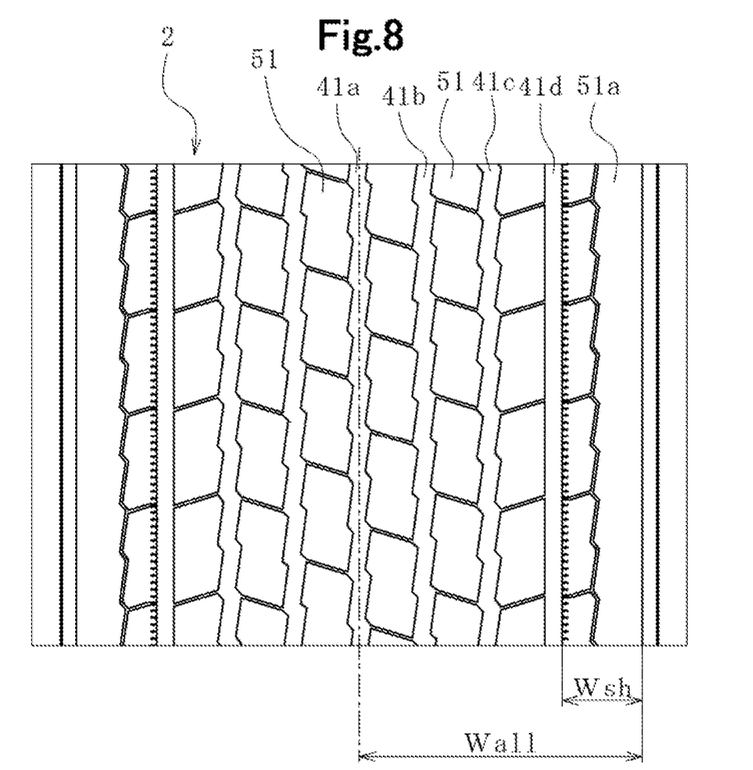
FIG. 8 is a partial development view of a tread portion of a pneumatic tire according to still another embodiment.

In the above embodiments, the tire including, as each land portion formed in the tread portion 2, the plurality of blocks 43, has been described, while as shown in FIG. 8, a tire including a plurality of rows of ribs 51 can obtain the same effect by adopting the above configurations. In this case, a shoulder land portion located between a shoulder main groove 41d which is located at the most outer side in a width direction of a tread portion 2 and a tread end is a shoulder rib 51a, and a width Wsh thereof is between 10% and 15% of a tread width Wall. In addition, a rubber volume Vsh of the shoulder rib 51a is between 25% and 35% of a total rubber volume Vall of the tread portion 2. Further, a liner distance from a groove bottom center of the shoulder main groove 41d to an outer edge of a reinforcement belt 13 is between −0.07 times and 0.11 times of a width of the reinforcement belt.

The tire according to the present invention is favorably applicable to a pneumatic tire (so-called super single tire) having an aspect ratio of not larger than 70% and a nominal section width of not smaller than 365. The tire according to the present invention is also applicable to a pneumatic tire having a small aspect ratio and falling outer side a range of a pneumatic radial tire for heavy load.

What is claimed is:

1. A pneumatic tire, comprising a belt layer arranged between a carcass and a tread portion,
    wherein the belt layer comprises:
    a first main working belt;
    a second main working belt arranged at an outer side of the first main working belt in a tire-radial direction; and
    a reinforcement belt,
    wherein a cord angle of the second main working belt differs from a cord angle of the first main working belt in a direction with respect to a tire-circumferential direction,
    a cord angle of the reinforcement belt is not smaller than 6 degrees and not larger than 9 degrees,
    a width of the reinforcement belt is equal to or wider than 50% of a tire-section width and not wider than either narrower one of the first and second main working belts,
    a plurality of main grooves extending in the tire circumferential direction and arranged in parallel in the tire width direction is formed in the tread portion, the plurality of main grooves comprises a first shoulder main groove, a second shoulder main groove and other main grooves disposed therebetween,
    a width of a first shoulder land portion located between the first shoulder main groove which is located at the most outer side in a width direction of the tread portion and a first tread end is between 10% and 15% of a tread width which is a distance from a center of the tread portion to one end of the tread portion, and a width of a second shoulder land portion located between the second shoulder main groove which is located at another most outer side in a width direction of the tread portion and a second tread end is between 10% and 15% of a tread width which is a distance from a center of the tread portion to another end of the tread portion,
    a groove depth of the first shoulder main groove and the second shoulder main groove is shallower than the groove depth of the other main grooves,
    a rubber volume of the other land portions defined by the other main grooves is a region radially outward of an arc surface connecting the groove bottoms of the other main grooves,
    a rubber volume of the land section defined by the first shoulder main groove and a first main groove of the other main grooves adjacent to the first shoulder main groove is a region radially outward of a surface including a tangent line connecting the groove bottoms of the first shoulder main groove and the adjacent first main groove, and a rubber volume of the land section defined by the second shoulder main groove and a second main groove of the other main grooves adjacent to the second shoulder main groove is a region radially outward of a surface including a tangent line connecting the groove bottoms of the second shoulder main groove and the adjacent second main groove,
    a rubber volume of the first shoulder land portion is a region radially outward of a circular arc surface passing through the groove bottom of the first shoulder main groove and a rubber volume of the second shoulder land portion is a region radially outward of a circular arc surface passing through the groove bottom the second shoulder main groove, and
    wherein a rubber volume of the first shoulder land portion and the second shoulder land portion are each between 25% and 35% of a total rubber volume of the tread portion.

2. The pneumatic tire according to claim 1, wherein a linear distance from a groove bottom center of at least one of the first shoulder main groove and the second shoulder main groove to an outer edge of the reinforcement belt is between −0.07 times and 0.11 times of a half-width of the reinforcement belt.

3. The pneumatic tire according to claim 1, wherein the reinforcement belt is arranged between the first main working belt and the second main working belt.

4. The pneumatic tire according to claim 1, wherein the cord angles of the first and second main working belts are respectively 20±10 degrees.

5. The pneumatic tire according to claim 4, wherein the cord angles of the first and second main working belts are respectively 17±5 degrees.

6. The pneumatic tire according to claim 1, wherein the belt layer further comprises a protection belt arranged at an outer side of the second main working belt in the tire-radial direction.

7. The pneumatic tire according to claim 1, wherein the belt layer further comprises a buffer belt arranged at an inner side of the first main working belt in the tire-radial direction.

8. The pneumatic tire according to claim 1, wherein the pneumatic tire has an aspect ratio of not larger than 70% and a nominal section width of not smaller than 365.

* * * * *